Patented Apr. 28, 1931

1,803,008

UNITED STATES PATENT OFFICE

GEORGE HOLLAND ELLIS AND WILLIAM OAKLAND GOLDTHORPE, OF SPONDON, NEAR DERBY, ENGLAND, ASSIGNORS TO CELANESE CORPORATION OF AMERICA, A CORPORATION OF DELAWARE

DYEING, PRINTING, OR STENCILING OF CELLULOSE ACETATE OR PRODUCTS MADE THEREWITH

No Drawing. Application filed December 3, 1926, Serial No. 152,517, and in Great Britain January 30, 1926.

This invention relates to the dyeing, printing or stenciling (all hereinafter in the claims included in the term dyeing) of threads, yarns, fabrics, films or other products made with or containing cellulose acetate.

In a previous U. S. Patent No. 1,618,413, the said George Holland Ellis has described processes for dyeing, printing or stenciling of cellulose acetate or yarns, threads, fabrics, films or other goods or products made therewith by means of any coloring matters or organic compounds having affinity for cellulose acetate or capable of coloring the same, but which are insoluble, practically insoluble or of relatively low solubility in water, said coloring matters or organic compounds being employed according to the said application in the form of soluble or more soluble modifications obtained by treating them, prior to addition to the dyebaths or preparations for printing or otherwise coloring with sulphoricinoleic or other sulphonated fatty acids or other bodies having oily or fatty characteristics, namely higher fatty acids or sulphonated or other derivatives thereof containing salt-forming groups (e. g. the sulpho group or carboxyl group or both sulpho and carboxyl groups) or with salts of any such bodies, for instance their alkali or ammonium salts. All such bodies and their salts are hereinafter and are in the specification of said U. S. patent included in the term bodies of oily or fatty characteristics.

In U. S. application S. No. 48,666 filed 6th August 1925, of which this application is a continuation in part and which eventuated into Patent No. 1,690,481, granted November 6, 1928, the present applicants have described processes for dyeing, printing or stenciling goods made with or containing cellulose acetate with dyestuffs, coloring matters or organic compounds having affinity for or capable of coloring cellulose acetate, but which are insoluble, insufficiently soluble or of relatively low solubility in water, said dyestuffs, coloring matters or organic compounds being employed in form of soluble or more soluble modifications obtained by pretreating them with one or more bodies of oily or fatty characteristics described in U. S. Patent No. 1,618,413 and one or more bodies termed "auxiliary" solvents. As examples of auxiliary solvents the said Patent No. 1,690,481 instances the following classes:—alkyl or alkylene halides, simple or "mixed" derivatives of the cyclic or aromatic series containing one or more amino, chlor or hydroxy groups, and hydrogenated derivatives of such or other aromatic compounds.

According to the present invention we have found that a further class of bodies namely hydrocarbons exhibit this auxiliary solvent action and that highly useful dyeings, printings or stencilings may be obtained on goods made with or containing cellulose acetate by employing the hydrocarbon bodies in conjunction with the aforesaid bodies of oily or fatty characteristics. Further, as auxiliary solvents, we may use one or more of the said hydrocarbon bodies in conjunction with one or more of the members of the classes of bodies mentioned in our previous Patent No. 1,690,481. The following are examples of the hydrocarbon bodies used according to the present invention:—aromatic hydrocarbons such for instance as benzene, toluene, xylene, cumene ($C_6H_5CH—(CH_3)_2$), propylbenzene, ortho-methylethylbenzene, mesitylene, diphenyl methane, naphthalene; paraffins such for example as heptane, triethylmethane, A-nonane, nonane; naphthene hydrocarbons from petroleum such for instance as cyclohepane dekanaphthene, undekanaphthene, dodekanaphthene, tetradekanaphthene, pentadekanaphthene, duodecylene (which occurs in Canadian petroleum); terpenes such for instance as turpentines, pinene, sylvestrene; unsaturated hydrocarbons such for instance as butylethylene, methylcyclopentene, tetramethylethylene, cyclohexadiene, cyclopentene, cymene $C_{10}H_{14}$, 1:1:2 trimethylcyclopentene and the like; or commercial liquids containing mixtures of the aforesaid compounds, such for instance as turpentine (which contains the relevant terpenes), and petroleum, solvent naphtha or commercial benzol (which contain mixtures of paraffin or aromatic hydrocarbons).

For the purpose of the present invention one or more hydrocarbons may be used in conjunction with one or more of the aforesaid bodies of oily or fatty characteristics (and in conjunction or not with one or more of the auxiliary solvents of our said previous Patent No. 1,690,481 for the solubilization of any insoluble or insufficiently soluble coloring matters or organic compounds having affinity for cellulose acetate. All water-insoluble or insufficiently water-soluble coloring matters or organic compounds having an affinity for or capable of coloring cellulose acetate are hereinafter in the claims included in the term relatively water-insoluble organic compounds capable of coloring cellulose acetate; further with reference to the application of the invention for dyeing, printing or stenciling the materials by means of the azoic process, that is to say wherein the actual dyestuff is produced on the cellulose acetate fibre or material by coupling of bases and developers on the material, it is understood that the expression "organic compounds capable of coloring cellulose acetate" applies to the said bases or developers in the sense that they are capable of coloring the cellulose acetate by such production of a dye thereon, whether or not the bases or developers themselves color cellulose acetate. Thus for instance we may employ the coloring matters or organic compounds described in Patent No. 1,618,413 for instance nonsulphonated or other relatively insoluble derivatives of the azo class containing or not containing primary or secondary or tertiary amino groups such as alkylated or arylated amino groups or substituent groups such as nitro, chlor, ethoxy or methoxy groups; simple amino bases (for application according to the azoic method) such as paranitraniline, metanitraniline, benzidine, dianisidine, dimethylaniline, alphanaphthylamine or diphenylamine; unreduced coloring matters of the benzo or naphthoquinone monoimide series generally comprised within the term indophenols; insoluble or relatively low soluble organic compounds or coloring matters of the following classes—diphenylmethane, triphenylmethane, triarylmethane, oxazine, azine, thiazine, unreduced indigoid or basic derivatives of the anthraquinone series (as for instance rosaniline base, alkylated or arylated rosaniline bases, pararosaniline base, tetramethyldiparaamido triphenyl carbinol, amido anthraquinones and amido hydroxy anthraquinones or their derivatives); or we may employ nonsulphonated derivatives of the pyrazolone series referred to in U. S. Patent No. 1,600,277, e. g., unsulphonated azo derivatives of pyrazolone compounds; or unreduced vat dyestuffs of the anthraquinone series referred to in U. S. Patent No. 1,641,965, e. g., the various dyes marketed under the trade marks Indanthrene, Cibanone, Algol, Helindone, and any other vat dyestuffs of the anthraquinone series; or nitro derivatives of diarylamines such as are referred to in U. S. Patent No. 1,618,415; or coloring matters or compounds of the stilbene group containing no sulpho groups in their constitution, such as are referred to in U. S. Patent No. 1,694,414 issued December 11, 1928.

The present invention is of especial use for the application of highly insoluble coloring matters or organic compounds such for instance as are comprised within the following chemical types:—azo and polyazo compounds, anthraquinone derivatives, indigoid derivatives, nitro-diarylamine derivatives, for instance 2-4-dinitro benzene-azo-diethyl-aniline, para nitrobenzene-azo-betanaphthol, benzene-azo-benzeneazobetanaphthol, symmetrical di-paratolyl-1:4-diamino-anthraquinone, 1-hydroxy-4:paratoyamino-anthraquinone, 1:paratolylamino-4-methylamino-anthraquinone, 4-paratoylamino-1-anthraquinone-N-methyl-pyridone, 2:4-dinitro-diphenylamine, 2:4-dinitro-3' hydroxy-diphenylamine-diparamethoxy-benzoyl-diamino-anthrarufin, 4'4''-dimethoxy-2:6-dialphaanthraquinonyl-diamino-anthraquinone, 3-(5:7 dibromoindole)-2'-thionaphthenindigo; and the unreduced so-called "vat" colors.

In carrying out the invention one or more of the insoluble or insufficiently soluble or relatively insoluble coloring matters or organic compounds having affinity for cellulose acetate or capable of coloring the same, may be treated with one or more of the aforesaid bodies of oily or fatty characteristics and one or more of the aforesaid hydrocarbons (and if desired, one or more of the auxiliary solvents of our prior application S. No. 48,666), in any order separately, or together in admixture, at any suitable temperature or pressure, in presence of little or no water, or in presence of larger quantities of water with subsequent concentration or drying, and it is understood that all such methods are hereinafter in the claims included in the term pretreating. The solubilized modifications thus obtained may be then added to the dyebaths, printing pastes or other preparations and the application to the goods be performed by methods commonly known in the arts.

The following are some examples which serve to illustrate how the invention may be performed, it being understood that these are given by way of illustration and are in no way limitative, and that the coloring matters or compounds, solubilizing agents, hydrocarbon bodies, proportions, temperatures and other conditions and the manner of operation may be varied widely:—

*Example 1*

1 lb. finely powdered para nitro diphenylamine is dissolved in 3 lbs. cyclohexane dispersed in 10 lbs. 50% Turkey red oil by gently warming to 60–70° C. Boiling soft water is now added to make up to ten gallons. This solution is now dredged into 250 gallons of cold soft water containing 2½ lbs. olive oil soap in solution.

100 lbs. cellulose acetate yarn in form of hanks are now entered and dyeing carried out by heating to 75° C. in ¾ hour and maintaining at 75-80° C. for a further ¾ hour. The goods which are dyed a full bright greenish yellow are now lifted, and washed thoroughly in soft water.

*Example 2*

1 lb. finely powdered 1 hydroxy 4 amino anthraquinone is dissolved by boiling with 10 lbs. of xylene. The hot solution is passed through a fine sieve into 15 lbs. 50% Turkey red oil, a quantity of boiling soft water added, and the whole stirred till homogeneous. The clear solution thus obtained is diluted to 20 gallons with boiling soft water, and dredged with good agitation into 250 gallons of cold soft water, contained in a suitable machine, to which have been added 5 lbs. olive oil soap.

100 lbs. cellulose acetate yarns in the form of knitted fabrics are now entered, and dyeing is carried out by heating to 75° C. in ¾ hour and maintaining at 75-80° C. for a further ¾ hour. The goods which are dyed a full bright red shade are now lifted, rinsed, and finished as may be desired.

*Example 3*

1 lb. finely powdered 4-chlor-2-nitro-4'-methoxydiphenylamine is ground with 10 lbs. sodium salt of sulphoricinoleic acid (50%) and the mixture heated to 60° C. with good stirring. 2½ lbs. of diphenylmethane are now stirred in, and after further stirring for a short time, boiling soft water (10 gallons) added.

The dyebath is prepared by pouring this solution into 300 gallons soft water contained in a suitable machine, in which 3 lbs. of soap have been previously dissolved. The temperature of the bath is raised to 75° C., and 100 lbs. of previously scoured fabric composed of cellulose acetate yarns is entered, and dyeing carried out for 1 hour at 75-80° C. When the fabric is dyed the requisite depth of golden orange shade it is lifted, rinsed and hydroextracted, dried and finished as may be desired.

*Example 4*

4 lbs. 4-nitro-2-methoxy-4'dimethylaminoazo benzene 25% paste are intimately mixed with 3 lbs. turpentine and 12 lbs. 50% Turkey red oil, sufficient boiling soft water being added to give a thin, smooth paste. The whole is now heated to 80° C. and diluted to 10 gallons with boiling soft water.

The clear solution thus formed is poured into 300 gallons soft water containing 2½ lbs. olive oil soap in solution.

100 lbs. cellulose acetate yarns in the form of hanks are now entered and dyeing carried out for ½ hr. during which time the temperature is raised to 75° C., the bath being kept at this temperature for a further period of 1 hour. The cellulose acetate yarn is now colored a full yellowish red shade, and after rinsing, may be finished, hydroextracted and dried.

What we claim and desire to secure by Letters Patent is:—

1. A process for the dyeing of materials comprising cellulose acetate which comprises treating said materials with relatively water-insoluble organic compounds capable of coloring cellulose acetate, said organic compounds being employed in the form of solubilized modifications obtained by pretreating them with a solubilizing agent comprising a body of oily or fatty characteristics and with at least one hydrocarbon.

2. A process for the dyeing of materials comprising cellulose acetate which comprises treating said materials with relatively water-insoluble organic compounds capable of coloring cellulose acetate, said organic compounds being employed in the form of solubilized modifications obtained by pretreating them with a solubilizing agent comprising a salt of sulphoricinoleic acid and with at least one hydrocarbon.

3. A process for the dyeing of materials comprising cellulose acetate which comprises treating said materials with relatively water-insoluble organic compounds capable of coloring cellulose acetate, said organic compounds being employed in the form of solubilized modifications obtained by pretreating them with a solubilizing agent comprising sodium salt of sulphoricinoleic acid and with at least one hydrocarbon.

4. A process for the dyeing of materials comprising cellulose acetate which comprises treating said materials with relatively water-insoluble organic compounds capable of coloring cellulose acetate, said organic compounds being employed in the form of solubilized modifications obtained by pretreating them with a solubilizing agent comprising a body of oily or fatty characteristics and with at least one cyclic hydrocarbon.

5. A process for the dyeing of materials comprising cellulose acetate which comprises treating said materials with relatively water-insoluble organic compounds capable of coloring cellulose acetate, said organic compounds being employed in the form of solubilized modifications obtained by pretreating them with a solubilizing agent comprising a salt of sulphoricinoleic acid and with at least one cyclic hydrocarbon.

6. A process for the dyeing of materials comprising cellulose acetate which comprises treating said materials with relatively water-insoluble organic compounds capable of coloring cellulose acetate, said organic compounds being employed in the form of solubilized modifications obtained by pretreating them with a solubilizing agent comprising sodium salt of sulphoricinoleic acid and with at least one cyclic hydrocarbon.

7. A process for the dyeing of materials comprising cellulose acetate which comprises treating said materials with relatively water-insoluble anthraquinone coloring matters capable of coloring cellulose acetate, said coloring matters being employed in the form of solubilized modifications obtained by pretreating them with a solubilizing agent comprising a body of oily or fatty characteristics and with at least one hydrocarbon.

8. A process for the dyeing of materials comprising cellulose acetate which comprises treating said materials with relatively water-insoluble anthraquinone coloring matters capable of coloring cellulose acetate, said coloring matters being employed in the form of solubilized modifications obtained by pretreating them with a solubilizing agent comprising a salt of sulphoricinoleic acid and with at least one hydrocarbon.

9. A process for the dyeing of materials comprising cellulose acetate which comprises treating said materials with relatively water-insoluble anthraquinone coloring matters capable of coloring cellulose acetate, said coloring matters being employed in the form of solubilized modifications obtained by pretreating them with a solubilizing agent comprising sodium salt of sulphoricinoleic acid and with at least one hydrocarbon.

10. A process for the dyeing of materials comprising cellulose acetate which comprises treating said materials with relatively water-insoluble anthraquinone coloring matters capable of coloring cellulose acetate, said coloring matters being employed in the form of solubilized modifications obtained by pretreating them with a solubilizing agent comprising a body of oily or fatty characteristics and with at least one cyclic hydrocarbon.

11. A process for the dyeing of materials comprising cellulose acetate which comprises treating said materials with relatively water-insoluble anthraquinone coloring matters capable of coloring cellulose acetate, said coloring matters being employed in the form of solubilized modifications obtained by pretreating them with a solubilizing agent comprising a salt of sulphoricinoleic acid and with at least one cyclic hydrocarbon.

12. A process for the dyeing of materials comprising cellulose acetate which comprises treating said materials with relatively water-insoluble anthraquinone coloring matters capable of coloring cellulose acetate, said coloring matters being employed in the form of solubilized modifications obtained by pretreating them with a solubilizing agent comprising sodium salt of sulphoricinoleic acid and with at least one cyclic hydrocarbon.

13. A process for the dyeing of materials comprising cellulose acetate which comprises treating said materials with relatively water-insoluble anthraquinone coloring matters capable of coloring cellulose acetate, said coloring matters being employed in the form of solubilized modifications obtained by pretreating them with a solubilizing agent comprising a body of oily or fatty characteristics and with xylene.

14. A process for the dyeing of materials comprising cellulose acetate which comprises treating said materials with relatively water-insoluble anthraquinone coloring matters capable of coloring cellulose acetate, said coloring matters being employed in the form of solubilized modifications obtained by pretreating them with a solubilizing agent comprising a salt of sulphoricinoleic acid and with xylene.

15. A process for the dyeing of materials comprising cellulose acetate which comprises treating said materials with relatively water-insoluble anthraquinone coloring matters capable of coloring cellulose acetate, said coloring matters being employed in the form of solubilized modifications obtained by pretreating them with a solubilizing agent comprising sodium salt of sulphoricinoleic acid and with xylene.

16. A process for the dyeing of materials comprising cellulose acetate which comprises treating said materials with relatively water-insoluble aminoanthraquinone coloring matters capable of coloring cellulose acetate, said coloring matters being employed in the form of solubilized modifications obtained by pretreating them with a solubilizing agent comprising a body of oily or fatty characteristics and with at least one hydrocarbon.

17. A process for the dyeing of materials comprising cellulose acetate which comprises treating said materials with relatively water-insoluble aminoanthraquinone coloring matters capable of coloring cellulose acetate, said coloring matters being employed in the form of solubilized modifications obtained by pretreating them with a solubilizing agent comprising a salt of sulphoricinoleic acid and with at least one hydrocarbon.

18. A process for the dyeing of materials comprising cellulose acetate which comprises treating said materials with relatively water-insoluble aminoanthraquinone coloring matters capable of coloring cellulose acetate, said coloring matters being employed in the form of solubilized modifications obtained by pretreating them with a solubilizing agent comprising sodium salt of sulphoricinoleic acid and with at least one hydrocarbon.

19. A process for the dyeing of materials comprising cellulose acetate which comprises treating said materials with relatively water-insoluble aminoanthraquinone coloring matters capable of coloring cellulose acetate, said coloring matters being employed in the form of solubilized modifications obtained by pretreating them with a solubilizing agent comprising a body of oily or fatty characteristics and with at least one aromatic hydrocarbon.

20. A process for the dyeing of materials comprising cellulose acetate which comprises treating said materials with relatively water-insoluble aminoanthraquinone coloring matters capable of coloring cellulose acetate, said coloring matters being employed in the form of solubilized modifications obtained by pretreating them with a solubilizing agent comprising a salt of sulphoricinoleic acid and with at least one aromatic hydrocarbon.

21. A process for the dyeing of materials comprising cellulose acetate which comprises treating said materials with relatively water-insoluble aminoanthraquinone coloring matters capable of coloring cellulose acetate, said coloring matters being employed in the form of solubilized modifications obtained by pretreating them with a solubilizing agent comprising sodium salt of sulphoricinoleic acid and with at least one aromatic hydrocarbon.

22. A process for the dyeing of materials comprising cellulose acetate which comprises treating said materials with relatively water-insoluble aminoanthraquinone coloring matters capable of coloring cellulose acetate, said coloring matters being employed in the form of solubilized modifications obtained by pretreating them with a solubilizing agent comprising a body of oily or fatty characteristics and with xylene.

23. A process for the dyeing of materials comprising cellulose acetate which comprises treating said materials with relatively water-insoluble aminoanthraquinone coloring matters capable of coloring cellulose acetate, said coloring matters being employed in the form of solubilized modifications obtained by pretreating them with a solubilizing agent comprising a salt of sulphoricinoleic acid and with xylene.

24. A process for the dyeing of materials comprising cellulose acetate which comprises treating said materials with relatively water-insoluble aminoanthraquinone coloring matters capable of coloring cellulose acetate, said coloring matters being employed in the form of solubilized modifications obtained by pretreating them with a solubilizing agent comprising sodium salt of sulphoricinoleic acid and with xylene.

25. A composition of matter applicable for the dyeing of cellulose acetate, comprising a solubilized modification of a relatively water-insoluble organic compound capable of coloring cellulose acetate, said solubilized modification comprising a body of oily or fatty characteristics as a solubilizing agent and at least one hydrocarbon.

26. A composition of matter applicable for the dyeing of cellulose acetate, comprising a solubilized modification of a relatively water-insoluble organic compound capable of coloring cellulose acetate, said solubilized modification comprising a body of oily or fatty characteristics as a solubilizing agent and at least one aromatic hydrocarbon.

27. A process of dyeing materials containing cellulose acetate which comprises dissolving a water insoluble aminoanthraquinone in xylene, filtering the solution into Turkey red oil, adding boiling water, then dredging into cold water containing olive oil soap and then entering cellulose acetate yarns in the form of fabrics therein.

28. A process of dyeing materials containing cellulose acetate which comprises dissolving about one pound of 1 hydroxy 4 amino anthraquinone in substantially ten pounds of xylene, filtering the solution into substantially 15 pounds of about 50% Turkey red oil, adding boiling water to make about 20 gallons, then dredging into about 250 gallons of cold water containing about 5 pounds of olive oil soap, and then entering about 100 pounds of cellulose acetate yarns in the form of fabrics therein.

In testimony whereof we have hereunto subscribed our names this 12th day of November, 1926.

GEORGE HOLLAND ELLIS.
WILLIAM OAKLAND GOLDTHORPE.